June 14, 1966
J. S. BOZEK
3,255,918
COMBINATION DRAWN TAPERED ALUMINUM
CAN WITH PLASTIC FILM CLOSURE
Filed June 7, 1963
2 Sheets-Sheet 2
FIG.4
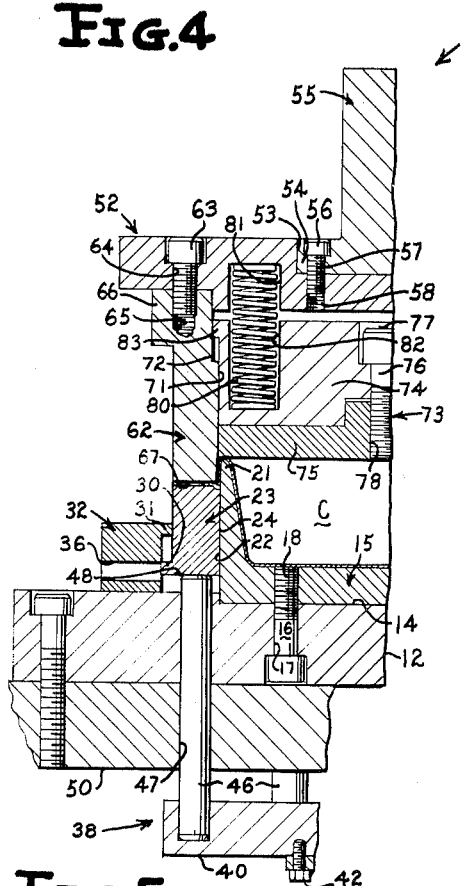
FIG.6
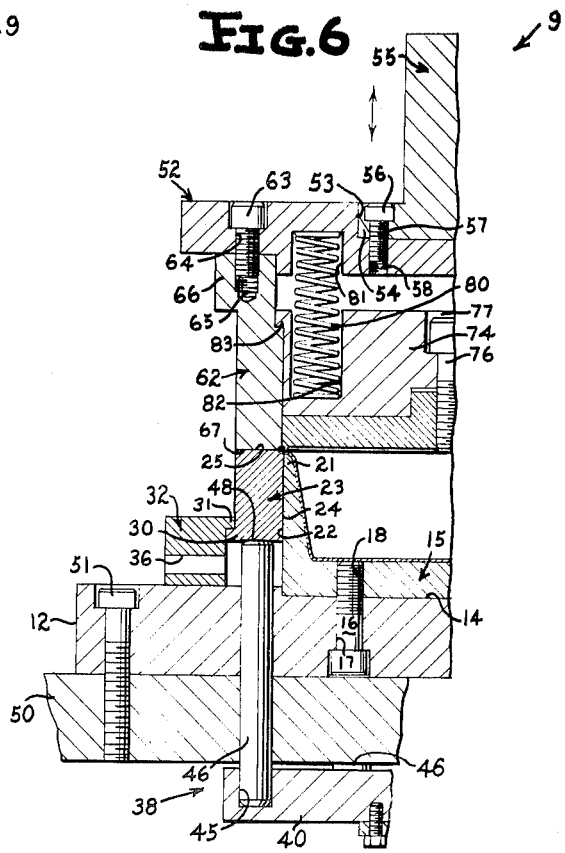
FIG.5
FIG.7
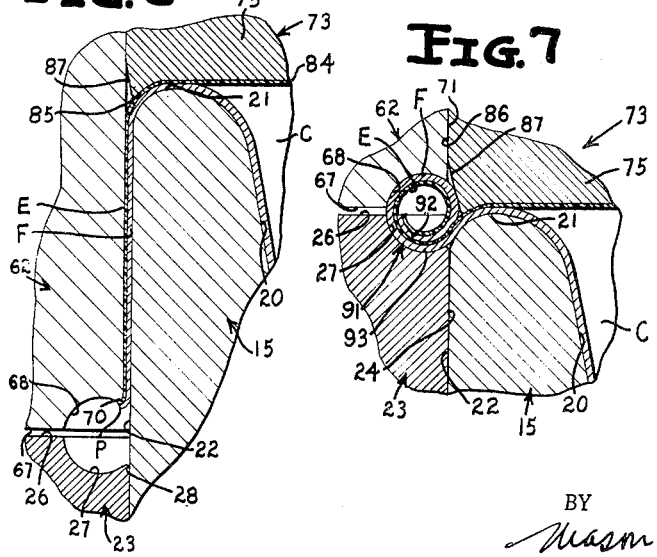
FIG.8
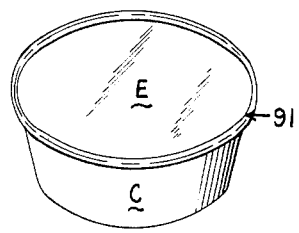
INVENTOR
John S. Bozek
BY Mason, Porter, Diller & Stewart
ATTORNEYS

United States Patent Office 3,255,918
Patented June 14, 1966

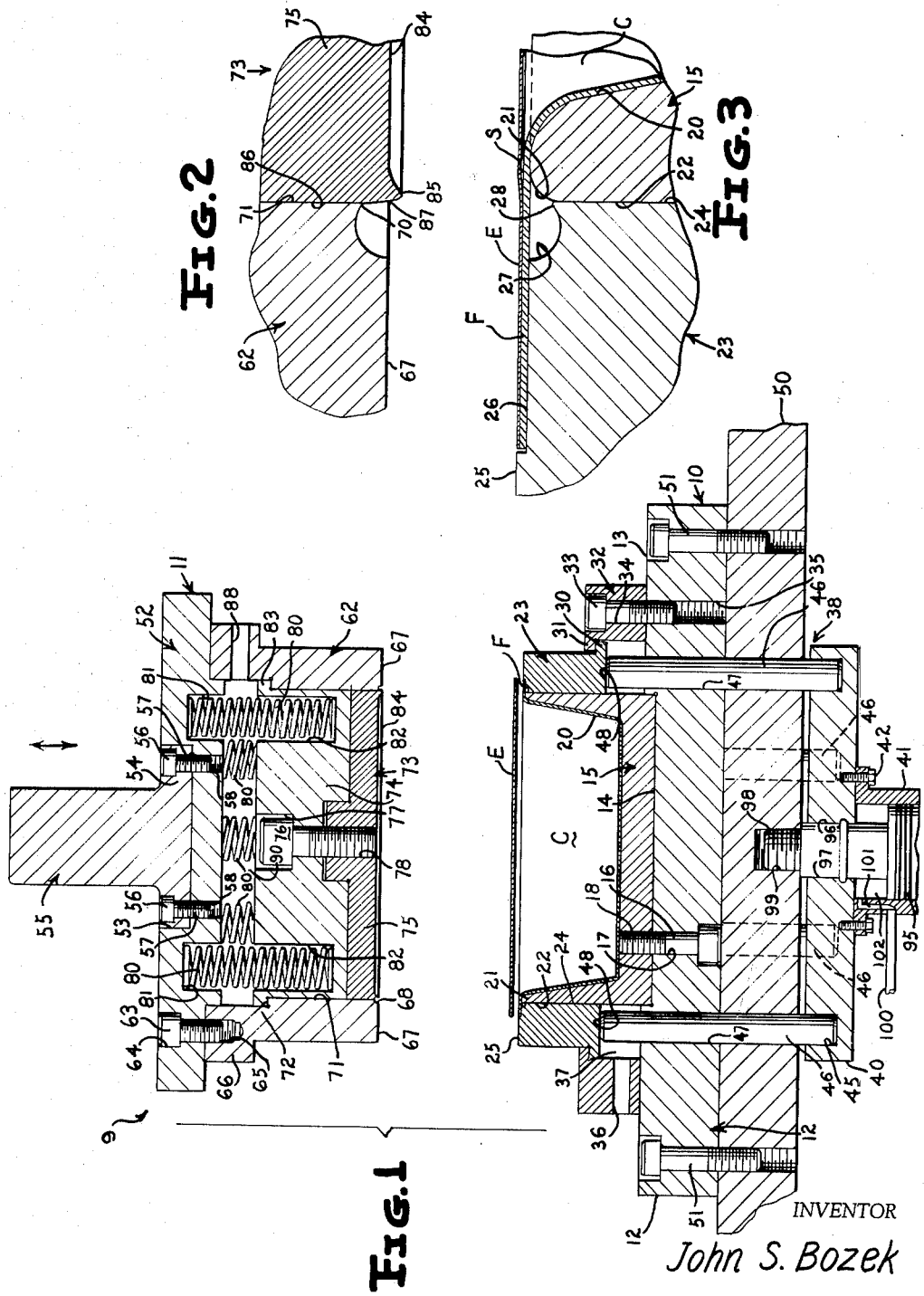

3,255,918
COMBINATION DRAWN TAPERED ALUMINUM CAN WITH PLASTIC FILM CLOSURE
John S. Bozek, Chicago, Ill., assignor to Continental Can Company, Inc., New York, N.Y., a corporation of New York
Filed June 7, 1963, Ser. No. 286,381
2 Claims. (Cl. 220—67)

This invention relates to a novel method and apparatus for securing a plastic film closure to a can or container body.

An object of this invention is to provide a novel apparatus for securing a closure to a container body comprising a die having first and second relatively movable die bodies arranged in axially opposed cooperative relationship, the first and second die bodies including immovable and movable die portions, the immovable die portion of the first die body having a cavity contoured to receive therein a container body having a flange upon which is supported a closure, the immovable die portion of the second die body being axially opposed to the movable die portion of the first die body whereby relative movement between the die bodies in a first direction causes the formation of a skirt-like portion surrounding the container body and the first and second die bodies further including means for curling the skirt-like portion upon relative movement of the die bodies in a second direction for securing the closure to the container body.

Another object of this invention is to provide a novel die of the character immediately above-described wherein the means for curling the skirt-like portion includes an annular groove in the movable die portion of the first die body opposing a similar annular groove in the immovable die portion of the second die body.

Another object of this invention is to provide a novel die for securing a plastic film closure to a drawn tapered aluminum can body, the novel die including first and second die bodies arranged in axially opposed cooperative relationship, the first die body having an annular movable die portion surrounding an immovable die portion provided with a cavity contoured to receive a tapered can body having a peripheral flange upon which is supported a plastic film closure, the second die body including an annular immovable die portion surrounding a movable die portion, the annular die portions being axially aligned and having cooperative forming surfaces whereby relative movement of the first and second die bodies in a first direction causes the formation of a skirt-like portion from the flange and the plastic film closure, and the die also includes means for rolling the skirt-like portion upon relative movement of the die bodies in a direction opposite the first direction to form a curled edge on the tapered can body which grips a portion of the plastic film closure and secures the same to the tapered can body.

Still another object of this invention is to provide a novel die of the type described in the latter object wherein the means for rolling the skirt-like portion is an annular groove in the movable die portion of the first die body opposing an annular groove in the immovable die portion of the second die body, and the annular groove in the immovable die portion of the first die body terminates in a peripheral lip which contacts a peripheral edge of the skirt-like portion to initiate the rolling thereof to form the curled can body edge.

A further object of this invention is to provide a novel method of securing a plastic closure to a container body by placing the plastic closure upon a flange of the container body, forming the flange and a portion of the plastic closure into a peripheral skirt-like portion surrounding the container body, and forming the flange into a curl to grip a portion of the closure thereby securing the plastic closure to the container body.

Still another object of this invention is the provision of a novel method of securing a closure to a container body by first applying a bead of sealing compound upon a flange of a container body, substantially coextensively overlaying a closure upon the flange of the container body and forming the flange into a curl to grip a portion of the closure to secure the same to the container body.

Still another object of this invention is to provide a novel method of securing a plastic film closure to a tapered can body having a flange substantially normal to the can body axis by positioning the plastic film closure in supporting relationship upon the flange, drawing the flange and a portion of the plastic film closure thereon axially to form a peripheral skirt-like portion surrounding the tapered can body and rolling the peripheral skirt-like portion in a direction opposite to the direction of drawing to form a curl which grips the overlayed portion of the plastic film closure and secures the same to the tapered can body.

With the above and other objects in view that will hereinafter appear the nature of the invention will be more clearly understood by reference to the following detailed description, the appended claims and the several views illustrated in the accompanying drawings.

In the drawings:

FIGURE 1 is a fragmentary vertical cross-sectional view taken axially through a novel die construction in accordance with this invention and illustrates a first lower die body arranged in axially opposed, cooperative relationship to a second upper die body, the first lower die body carrying an immovable die portion provided with a cavity in which is seated a tapered, flanged can body and an annular movable die portion surrounding the immovable die portion, the annular movable die portion carried by the first die body having an annular groove opposing a similar annular groove in an immovable annular die portion carried by the second die body and a plastic film closure prior to being seated upon the flange of the can body.

FIGURE 2 is an enlarged fragmentary sectional view of the movable and immovable annular die portions carried by the second die body, and more clearly illustrates the annular groove terminating adjacent a relieved portion of a central movable die portion carried by the second die body.

FIGURE 3 is an enlarged fragmentary sectional view of the movable and immovable die portions carried by the first die body and more clearly illustrates the annular groove terminating in an upwardly directed peripheral lip, the flange of the can body seated in a shalow annular groove of the annular movable die portion, a bead of sealing compound around the body flange and the plastic film closure seated upon and supported by the body flange.

FIGURE 4 is a fragmentary, axial, cross-sectional view of the die of FIGURE 1 after the first and second die bodies have been moved relative to each other in a first direction, and illustrates the formation of a skirt-like portion from the body flange and a portion of the closure.

FIGURE 5 is an enlarged fragmentary sectional view and clearly illustrates the cooperative relationship of the central immovable die portion carried by the first die body and the annular immovable die portion carried by the second die body during the formation of the skirt-like portion.

FIGURE 6 is a fragmentary, axial, cross-sectional view of the die of FIGURE 4 after the first and second die bodies have again been moved relative to each other to form a curl from the skirt-like portion of FIGURES 4 and 5.

FIGURE 7 is an enlarged fragmentary sectional view of the curl formed by the first and second die bodies, and illustrates the curl gripping a portion of the closure for securing the same to the can body.

FIGURE 8 is a top perspective view of a combined can body and closure, and illustrates an external peripheral curl formed by the die of FIGURES 1 through 7 securing the closure to the can body.

A die constructed in accordance with this invention is best illustrated in FIGURES 1, 4 and 6 of the drawings, and is generally designated by the reference numeral 9. The die 9 comprises a first, lower die body 10 and a second, upper die body 11. The first and second die bodies, 10 and 11 respectively, are arranged in opposed, axial alignment, and the die bodies 10 and 11 are normally positioned in spaced relationship to each other, as is best illustrated in FIGURE 1 of the drawings.

The first, lower die body 10 includes a circular plate 12 having an upper surface 13 provided with a central, upwardly opening recess 14. A central die portion 15 is seated in the upwardly opening recess 14 of the plate 12. A plurality of identical bolts 16 (only one being shown) are each received in an associated counterbored opening 17 in the plate 12 of the first die body 10. A threaded bore 18 in the central die portion 15 is in axial alignment with each of the plurality of counterbored openings 17 for threaded engagement with each of the bolts 16. In this manner, the central die portion 15 is immovably secured to the plate 12 of the first die body 10.

An upwardly opening cavity 20 is formed in the central die portion 15 immovably carried by the plate 12. The cavity 20 is tapered to correspond to the configuration of a container or can body C seated therein. The can body C is preferably made from a relatively light-gauge ductile metal, such as aluminum by drawing, and includes a closure receiving flange F which is disposed substantially normally to the can body axis. The immovable central die portion 15 of the first die body 10 further includes an annular, upper shoulder 21 (see FIGURE 3) which gradually blends into an exterior peripheral forming surface 22 of the central die portion 15.

An annular, movable die portion 23 surrounds the immovable central die portion 15 of the first die body 10. The annular movable die portion 23 includes a peripheral wall 24 in sliding contact with the exterior peripheral forming surface 22 of the immovable central die portion 15 (FIGURE 3), and an upper annular wall 25 provided with a relatively shallow, annular groove 26. The relatively shallow annular groove 26 terminates at a substantially annular, curling groove 27 terminating in a peripheral curl-starting lip 28 adjacent the annular shoulder 21 of the immovable central die portion 15, as is best illustrated in FIGURE 3.

An integral, outwardly directed, peripheral flange 30 of the annular movable die portion 23 cooperates with an integral, inwardly directed peripheral flange 31 of an annular collar 32. The annular collar 32 is secured to the plate 12 of the first die body 10 by a plurality of circumferentially arranged bolts 33 (only one of which is shown in FIGURE 1). Each of the bolts 33 passes through a counterbored opening 34 in the annular collar 32 and is threadably received in a respective, axially aligned threaded bore 35 in the plate 12. The peripheral flanges 30 and 31 act as stops to limit the upward movement of the movable annular die portion 23 from the position illustrated in FIGURE 4 to the positions shown in FIGURES 1 and 6 of the drawings. A radial port 36 in the annular collar 32 aids in bleeding off any air present in an annular chamber 37 between the plate 12, the annular collar 32, the movable annular die portion 23 and the immovable central die portion 15 during the movement of the movable die portion 23.

A reciprocating mechanism 38 is operated in a conventional manner to impart movement to the movable annular die portion 23 of the first die body 10. The reciprocating mechanism 38 comprises a plate 40 and an air cylinder 41 secured together by a plurality of identical bolts 42. A plurality of apertures 45 are formed in the plate 40 of the reciprocating mechanism 38, and an identical cylindrical rod 46 is press-fit in each of these apertures 45. Each of the cylindrical rods 46 is slidably received through a guide bore 47 in the plate 12. Each of the guide bores 47 underlies the movable annular die portion 23 for guiding an end portion 48 of each of the cylindrical rods 46 through the annular chamber 37 into contact with the annular movable die portion 23. The guide bores 47 also pass through a stationary bolster plate 50 on the press (not shown) on which the die unit 9 is mounted. The plate 12 is attached to the bolster plate 50 by a plurality of bolts 51.

The second die body 11 of the die 9 comprises a substantially disc-like plate 52 having an upwardly opening circular, central recess 53. A peripheral flange 54 of a reciprocal rod 55 is received in the central recess 53 of the disc-like plate 52 and secured thereto by a plurality of identical bolts 56. Each of the bolts 56 is inserted through a counterbored opening 57 in the flange 54 and is threadably received in a threaded bore 58 of the disc-like plate 52. The rod 55 is attached to the ram of the press for vertical reciprocation in the usual manner.

An annular die portion 62 depends from the disc-like portion 52 of the second die body 11 and is immovably attached thereto by a plurality of identical bolts 63 (only one of the bolts being illustrated in FIGURES 1, 4 and 6). Each of the bolts 63 passes through a counterbored opening 64 in the disc-like portion 52 and is threadably received in an associated, axially aligned threaded bore 65 formed in a flange portion 66 of the annular die portion 62. A lower annular wall 67 of the immovable annular die portion 62 of the second die body 11 opposes the upper annular wall 25 of the movable, annular die portion 23 of the first die body 10. As is best illustrated in FIGURE 2 of the drawings, the lower annular wall 67 of the immovable annular die portion 62 terminates in an annular curling groove 68. The annular curling groove 68 of the movable annular die portion 62 opens downwardly in opposed relationship to the upwardly opening annular curling groove 27 in the annular movable die portion 23. The annular curling groove 68 terminates in a peripheral lip 70 which gradually blends with an interior peripheral forming surface 71 of the immovable annular die portion 62. The internal peripheral forming surface 71 of the immovable annular die portion 62 terminates at a peripheral shoulder 72.

A central, substantially circular die portion 73 is mounted for reciprocal movement within the immovable annular die portion 62 of the second die body 11. The movable die portion 73 includes an upper body 74 and a lower body 75 secured together by a bolt 76 seated in a counterbore opening 77 of the upper body 74 and threadably secured in an axially aligned threaded bore 78 of the lower body 75.

The movable die portion 73 is normally maintained in spaced relationship to the disc-like portion 52 of the second die body 10 by a plurality of identical compression springs 80. Each compression spring 80 is seated in an associated downwardly opening recess 81 formed in the disc-like plate 52 and an aligned upwardly opening recess 82 in the upper body 74 of the movable die portion 73. An outwardly directed peripheral flange 83 of the upper body 74 of the movable die portion 73 abuts the peripheral shoulder 72 of the movable annular die portion 62 to limit the downward movement of the movable die portion 73 under force exerted by the compression springs 80.

A relatively shallow, substantially circular recess 84 is formed in the lower body 75 of the movable die portion 73 and opens downwardly toward the central immovable die portion 15 of the first die body 10. The substantially shallow circular recess 84 gradually terminates at a depending peripheral lip 85. As is best illustrated in FIGURE 2 of the drawings, a peripheral surface 86 of the lower body 75 contacts the inner peripheral forming surface 71 of the annular, immovable die portion 62. The peripheral surface 86 includes a peripherally relieved portion 87 between the depending peripheral lip 85 of the lower body 75 and the peripheral lip 70 of the immovable annular die portion 62 in the position of the die portions 62 and 73 illustrated in FIGURES 1 and 2 of the drawings. In the position of the die portions 62 and 73 shown in FIGURE 2, it should also be noted that the depending peripheral lip 85 of the movable die portion 73 depends below and beyond the lower annular wall 67 of the immovable annular die portion 62 for a purpose which shall be described hereafter.

A radial port 88 (see FIGURE 1) provided in the flange portion 66 of the annular die portion 62 functions in a manner substantially indentical to the radial port 36 in the annular collar 32 of the first die body 10 to relieve air in a chamber 90 between the disc-like plate 52 and the upper body 74 of the movable die portion 73 during the movement thereof with respect to the depending annular die portion 62.

At this time, it is pointed out that the reciprocating mechanism 38 always resiliently urges the annular movable die portion 23 in an upward direction. This is accomplished by means of the air cylinder 41 which has a piston 95 attached to a piston rod 96. The piston rod 96 slides in a bore 97 in the plate 40. An upper end 98 of the piston rod is threaded into a threaded bore 99 in the bolster plate 50. Compressed air is supplied through a pipe 100 and passageway 101 to a chamber 102, which is formed above the piston 95. It will be apparent that if a constant supply of compressed air is supplied to the chamber 102 the annular movable die portion 23 will always be resiliently urged upwardly by the rods 46.

A closure is secured to a container or can body by the novel die 9 of this invention by first placing a can body, such as the can body C, into the cavity 20 of the central die portion 15 of the first die body 10, as is best illustrated in FIGURES 1 and 3 of the drawings. As has been heretofore noted, the cavity 20 is contoured to the general configuration of the can body C and readily receives the can body C therein. The flange F of the can body C rests in and is supported by the substantially shallow annular groove 26 in the upper annular wall 25 of the movable annular die 23. The depth of this shallow, annular groove 26 is slightly greater than the thickness of the flange F. A small bead of sealing compound S may, if found necessary or desirable, be applied around the flange F of the can body C in the position clearly illustrated in FIGURE 3 of the drawings. A closure or end E is then placed upon and supported by the flange F of the can body C. The combined thicknesses of the flange F and the closure E are substantially identical to the depth of the shallow annular groove 26 in the movable annular die portion 23 of the first die body 11. The closure E is a relatively, flexible disc of plastic film material such as Saran or Mylar.

The upper or second die body 11 is then operated by the ram of the press in a conventional manner and reciprocated from the position in FIGURE 1 to the position illustrated in FIGURE 4. During this movement of the second die body 11, the depending peripheral lip 85 of the lower body 75 first contacts the plastic film closure E because, as heretofore noted, the peripheral lip 85 depends below the surface of the lower annular wall 67 of the immovable annular die portion 62, as is clearly shown in FIGURE 2 of the drawings. The depending peripheral shoulder 85 and the annular shoulder 21 of the central die portion 15 of the first die body 11 thus cooperate to initially grip the plastic film closure E and the flange F to preclude undesired relative movement therebetween.

Almost instantaneous with this initial gripping of the plastic film closure E and the flange F, the lower annular wall 67 of the descending annular die portion 62 contacts the upper annular wall 25 of the annular movable die portion 23 of the first die body 11 and urges the same downwardly whereby the flange F and the plastic film closure E are drawn out of the shallow, annular groove 26 and formed into a skirt-like portion surrounding the can body C by the inner peripheral forming surface 71 of the annular die portion 62 and the exterior peripheral forming surface 22 of the immovable central die portion 15, as is best illustrated in FIGURE 5 of the drawings. It should be particularly noted that as the skirt-like portion is formed from the flange F and a portion of the plastic film closure E, the plurality of springs 80 are compressed (see FIGURE 4) thereby increasing the gripping force exerted against the flange F and the plastic film closure E by the annular shoulder 21 and the depending peripheral lip 85. The volume of the chambers 37 and 90 are also decreased during this movement and the radial ports 36 and 88 permit the escape of air from these respective chambers. The cylindrical rods 46 will be forced downwardly with the downward movement being resisted by the compressed air in the chamber 102 of air cylinder 41.

The skirt-like portion formed by the peripheral forming surfaces 71 and 22 of the respective die portions 62 and 15 terminates in an outwardly directed peripheral flare P which conforms generally to the configuration of the peripheral lip 70 of the annular die portion 62, as is best illustrated in FIGURE 5 of the drawings. This peripheral flare P of the skirt-like portion overlies the peripheral lip 28 of the annular movable die portion 23 of the first die body 10. Thus, as the reciprocating rod 55 is then moved upwardly by the ram of the press in a conventional manner from the position of FIGURE 4 to the position shown in FIGURE 6, the peripheral lip 28 being upwardly urged by the reciprocating mechanism 38, in rising, initially contacts the peripheral flare P. The outward peripheral flare P forms, in effect, the start of a curl which is formed by the upward advancement of the movable annular die portion 23 caused by the reciprocating mechanism 38 and the simultaneous upward retraction of the second die body 11.

The peripheral lip 28 of the movable annular die 23 urges the peripheral flare P of the skirt-like portion against the surface of the annular curling groove 27 and the surface of the annular curling groove 68 of the annular die portion 62 thereby rolling or curling the skirt-like portion axially upwardly with respect to the can body C to form the completed peripheral curl shown in FIGURE 7. The curl thus formed by the die 9 is generally designated by the reference numeral 91, and, as shown in FIGURE 7, is formed by rolling or curling the flange F substantially 540 degrees. Two approximately 180 degree portions 92 and 93 of the curl 91 are overlappingly curled and therebetween grip a portion of the plastic film closure E. It will also be noted that the curl 91 conforms to the general configuration of the annular curling grooves 27 and 68, as well as to the peripherally relieved portion 87 of the movable die body 73 when the die bodies are in the position illustrated in FIGURE 6 of the drawings at the completion of the curling operation.

The upper or second die body 11 is reciprocated from the position shown in FIGURE 6 to the position illustrated in FIGURE 1 at which time the now closed can body C is removed from the cavity 20 in the immovable central die portion 15 of the first die body 10. To aid in the removal of the can body C from within the cavity 20 a conventional lifting pad (not shown) may, if desired, be provided in the bottom of the cavity 20 for operation in a conventional manner to dislodge the can body C. The completely closed can body can then be removed quite readily from within the cavity 20 and the cycle may be repeated to secure another plastic film closure to another flanged can body by repeating the operation heretofore described.

The can body C with the plastic film closure E secured thereto by the curl 91 is illustrated in the top perspective view of FIGURE 8 after the removal thereof from the novel die 9 of this invention.

As has been heretofore noted, the bead of sealing compound S need not be applied to the flange F of the can body C and it is also within the scope of this invention to operate the die 9 in the manner just described in a vacuum or inert gas atmosphere if desired.

It is also within the scope of this invention to substitute a peripheral bead of adhesive for the small bead of sealing compound S shown in FIGURE 3 of the drawings.

From the foregoing, it will be seen that novel and advantageous provision has been made for carrying out the desired end. However, attention is directed to the fact that variations may be made in the die disclosed herein without departing from the spirit and scope of this invention as defined in the appended claims.

I claim:
1. A combined container and closure, the container comprising a container body constructed of relatively ductile light gauge metal, said container body having an upper radially outwardly directed peripheral shoulder defining a mouth of the container body, said shoulder terminating in an outwardly directed peripheral curl, said curl being first downwardly and outwardly curled and terminating in a free peripheral edge portion, said curl being curled beyond 360 degrees whereby opposite surface portions thereof oppose each other adjacent and below said shoulder, a thin plastic film closure closing the container body opening, said film closure including a major flat central portion and a peripheral edge portion, said major flat central portion being in a plane normal to the container body axis and tangential to said shoulder, said peripheral edge portion of the film closure substantially coextensively overlying one of the curl surface portions whereby a portion of said film closure between the opposed curled portions is gripped therebetween, said curl having a center, and a plane through the major flat central portion of the film closure passing generally through the center of said curl.

2. A combined container and closure, the container comprising a container body constructed of relatively ductile light gauge metal, said container body having an upper radially outwardly directed peripheral shoulder defining a mouth of the container body, said shoulder terminating in an outwardly directed peripheral curl, said curl being first downwardly and outwardly curled and terminating in a free peripheral edge portion, said curl being curled beyond 360 degrees whereby opposite surface portions thereof oppose each other adjacent and below said shoulder, a thin plastic film closure closing the container body opening, said film closure including a major flat central portion and a peripheral edge portion, said major flat central portion being in a plane normal to the container body axis and tangential to said shoulder, said peripheral edge portion of the film closure substantially coextensively overlying one of the curl surface portions whereby a portion of said film closure between the opposed curled portions is gripped therebetween, said curl having a center, a plane through the major flat central portion of the film closure passing generally through the center of said curl, and a peripheral area of sealing compound between said shoulder and an opposing portion of said plastic film closure.

References Cited by the Examiner

UNITED STATES PATENTS

| | | | |
|---|---|---|---|
| 294,167 | 2/1884 | Walsh | 220—79 |
| 636,646 | 11/1899 | Draper | 220—79 |
| 670,720 | 3/1901 | Mungiven | 220—77 |
| 829,477 | 8/1906 | Kruse | 220—67 |
| 865,538 | 9/1907 | Smith | 220—79 |
| 1,995,860 | 3/1935 | Mundy | 113—30 |
| 2,104,224 | 1/1938 | Fisher | 113—30 |
| 2,337,452 | 12/1943 | Compo | 113—121 |
| 2,979,224 | 4/1961 | Henchert | 220—67 |
| 3,070,058 | 12/1962 | Boyer | 113—121 |
| 3,073,480 | 1/1963 | Henchert | 220—67 |
| 3,083,663 | 4/1963 | Stuchbery et al. | 113—121 |
| 3,108,710 | 10/1963 | Lange et al. | 220—67 |

FOREIGN PATENTS 827,758   4/1938   France.

THERON E. CONDON, *Primary Examiner.*

GEORGE E. LOWRANCE, *Examiner.*

R. A. JENSEN, G. T. HALL, *Assistant Examiners.*